UNITED STATES PATENT OFFICE.

JOHN D. PRINCE, OF BOSTON, MASSACHUSETTS.

LEATHER SUBSTITUTE.

1,336,858. Specification of Letters Patent. Patented Apr. 13, 1920.

No Drawing. Application filed December 7, 1918. Serial No. 265,760.

*To all whom it may concern:*

Be it known that I, JOHN D. PRINCE, a citizen of the United States, and resident of Boston, in the county of Suffolk and State of Massachusetts, have invented a new and useful Improvement in Leather Substitutes, of which the following is a specification.

This invention relates to an improvement in leather substitutes, consisting essentially of a rubber compound, with the object in view of providing a material of this kind which has the tough, slow-flexing qualities of leather and therefore eliminates the springy and elastic qualities of rubber. A further object is to provide such a material which is adapted to be used for manufacturing soles and heels of shoes and which may be treated by the same machinery and in the same manner as leather is commoly treated for this purpose.

The invention, broadly considered, consists in the combination of a wax, such, for instance, as the wax which is known as "Montan" or "Montan-sub", with rubber and the other ingredients and adulterants ordinarily employed in the manufacture of vulcanized rubber products.

The wax may be combined with the rubber and other said ingredients according to the custom followed in the manufacture of vulcanized rubber products, as by mixing the ingredients between suitably heated millrolls, and then sheeting the same between calender rolls into the desired thickness. Furthermore, the compound may be vulcanized in the ordinary way, and may be molded to form or molded in bulk and cut or died to form. I prefer to add the waxy substance in a finely subdivided or powdered form, or I may dissolve it in gasolene or the like and then incorporate it with the other ingredients.

An important feature of this product resides in the fact that it may be bent into the desired shape and has a very slight tendency, when compared with ordinary rubber compounds used for shoe soles and the like, to spring back to its original form. This is highly desirable in connection with shoe soles for high heel shoes, as it avoids a strain upon the sewing which is continually exercised by ordinary rubber compounds when used as a substitute for leather, after the same has been incorporated in the shoe.

Furthermore, the material may be subjected to the action of a slitting machine ordinarily employed in the manufacture of leather shoe soles, and may be cut thereby so as to leave a smooth, even surface. It is equally susceptible to the proper action of the grinding and buffing machines ordinarily employed.

The inability of ordinary rubber compound leather substitutes to be operated upon by these machines with satisfactory results, has been a great drawback to their commercial use.

Again, the substance readily takes a highly polished surface, so that the edges, and if desired, the bottoms of the soles and heels, may be polished by following the procedure ordinarily employed in connection with leather.

I have found that the "aging" qualities of this material are very high, and attribute this to the fact that the waxy substance melts below the temperatures ordinarily employed in vulcanization, and thereby thoroughly permeates the mixture and acts as a protective coating or insulation for the other ingredients. For instance, the "Montan-sub" melts at about 120° to 200° F., while a customary vulcanizing temperature is about 285° F. The material is very tough and dense, and I have determined by test that its grinding resistance is about 200% greater than that of the best leather. Furthermore, it provides a non-slipping surface, and is not subject to "spreading" as are ordinary rubber compound leather substitutes.

The waxy substance, preferably "Montan" or "Montan-sub" may be employed, according to my actual observation, in any percentage varying from about 1% to about 50% of the compound.

While it will be clear to anyone familiar with the rubber industry how to employ this waxy ingredient, from the foregoing description, I may give the following illustrations of practical compounds, to wit:

1. Crude rubber, rubber substitute, mineral rubber, wax (*e. g.*, "Montan-sub"), color pigment, filler, litharge, magnesia oxid, sulfur.

2. Crude rubber, mineral rubber, wax (*e. g.* "Montan-sub"), whiting, color pigment, sulfur.

3. Reclaimed rubber (*e. g.*, shoddy), mineral rubber, crude rubber, wax (*e. g.* "Montan-sub"), aluminum flake, color pigment, magnesia carbonate, sulfur.

As already stated, these ingredients may be compounded and vulcanized in the manner ordinarily followed in the rubber industry.

For the purpose of clearness, I may give the following specific formulæ, but these must be understood as for the purpose of illustration only:

1.

| | |
|---|---|
| Pale crape (crude rubber) | 36% |
| Reclaimed rubber (shoddy) | 10% |
| Lamp black | 12% |
| Whiting | 12% |
| Mineral rubber | 4% |
| Wax ("Montan-sub") | 14% |
| Magnesia oxid | 4% |
| Litharge | 3% |
| Sulfur | 5% |

(Vulcanize for 25 minutes at 65 pounds steam pressure).

2.

| | |
|---|---|
| Smoked sheet (crude rubber) | 5% |
| Reclaimed rubber (shoddy) | 45% |
| Carbon black | 5% |
| Aluminum flake | 19% |
| Magnesia carbonate | 4% |
| Wax (carnauba) | 14% |
| Litharge | 4% |
| Sulfur | 4% |

(Vulcanize for 15 minutes at 75 pounds steam pressure).

I desire it to be understood that various changes may be resorted to in the ingredients, percentages and methods of mixing and vulcanizing herein described and that I do not intend to be limited to the details herein set forth except as the same may be specifically included in the claims.

What I claim is:—

1. A composition of matter useful as a leather substitute, comprising rubber and wax of the Montan class, whereby the said composition of matter has the tough, slow-flexing qualities of leather and is devoid of the springy, elastic qualities of rubber.

2. A composition of matter useful as a leather substitute, comprising rubber and "Montan-sub" wax, whereby the said composition of matter has the tough, slow-flexing qualities of leather and is devoid of the springy, elastic qualities of rubber.

3. A composition of matter useful as a leather substitute, comprising rubber and wax of the Montan class, compounded with sulfur and vulcanized, whereby the said composition of matter has the tough, slow-flexing qualities of leather and is devoid of the springy, elastic qualities of rubber.

4. A composition of matter useful as a leather substitute, comprising rubber and "Montan-sub" wax, compounded with sulfur and vulcanized, whereby the said composition of matter has the tough, slow-flexing qualities of leather and is devoid of the springy, elastic qualities of rubber.

In testimony, that I claim the foregoing as my invention, I have signed my name this 20th day of November, 1918.

JOHN D. PRINCE.